United States Patent
Burns et al.

(10) Patent No.: US 8,031,449 B2
(45) Date of Patent: Oct. 4, 2011

(54) FAST-RESPONDING SHORT CIRCUIT PROTECTION SYSTEM WITH SELF-RESET FOR USE IN CIRCUIT SUPPLIED BY DC POWER

(75) Inventors: Bradley M. Burns, Titusville, FL (US); Norman N. Blalock, Rockledge, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 140 days.

(21) Appl. No.: 12/485,979

(22) Filed: Jun. 17, 2009

(65) Prior Publication Data
US 2009/0310270 A1 Dec. 17, 2009

Related U.S. Application Data

(60) Provisional application No. 61/073,204, filed on Jun. 17, 2008.

(51) Int. Cl.
*H02H 3/24* (2006.01)
(52) U.S. Cl. ............................................ 361/90; 361/92

(58) Field of Classification Search .................... 361/18, 361/93.7–93.9, 90, 92
See application file for complete search history.

(56) References Cited

U.S. PATENT DOCUMENTS

| | | | | |
|---|---|---|---|---|
| 5,221,887 | A * | 6/1993 | Gulczynski | 323/285 |
| 5,757,600 | A | 5/1998 | Kiraly | |
| 6,046,896 | A * | 4/2000 | Saeki et al. | 361/86 |
| 6,118,254 | A * | 9/2000 | Faulk | 320/141 |
| 7,209,335 | B2 * | 4/2007 | Kanamori et al. | 361/93.1 |
| 7,800,869 | B1 * | 9/2010 | Daugherty | 361/18 |

* cited by examiner

*Primary Examiner* — Danny Nguyen
(74) *Attorney, Agent, or Firm* — Randall M. Heald; Peter J. Van Bergen

(57) ABSTRACT

A short circuit protection system includes an inductor, a switch, a voltage sensing circuit, and a controller. The switch and inductor are electrically coupled to be in series with one another. A voltage sensing circuit is coupled across the switch and the inductor. A controller, coupled to the voltage sensing circuit and the switch, opens the switch when a voltage at the output terminal of the inductor transitions from above a threshold voltage to below the threshold voltage. The controller closes the switch when the voltage at the output terminal of the inductor transitions from below the threshold voltage to above the threshold voltage.

19 Claims, 4 Drawing Sheets

FAST-RESPONDING SHORT CIRCUIT PROTECTION SYSTEM WITH SELF-RESET FOR USE IN CIRCUIT SUPPLIED BY DC POWER

CROSS-REFERENCE TO RELATED APPLICATIONS

This application claims the benefit under 35 U.S.C. §119 (e) of U.S. Provisional Application Ser. No. 61/073,204 filed on Jun. 17, 2008, the contents of which are incorporated herein by reference.

ORIGIN OF INVENTION

The invention described herein was made in the performance of work under a NASA contract, and is subject to the provisions of Public Law 96-517 (35 U.S.C. §202) in which the Contractor has elected not to retain title.

BACKGROUND OF THE INVENTION

1. Field of the Invention

The present invention is directed to short circuit protection for DC powered loads, and more particularly to a fast-responding short circuit protection system that resets itself once the short circuit has been removed.

2. Description of Related Art

Short circuit protection in electrical circuits is generally provided by the combination of a fuse, a diode, and a resistor, in series between a DC power source (e.g., a battery) and an electrical load. One problem with this design is that the resistor wastes power as it must be sized to limit current. Another problem is the reaction time of a fuse where a fast-response, commercially-available fuse still requires approximately 1100 micro-seconds to open or blow upon the sensing of a short circuit. Unfortunately, this may not be fast enough for some applications. Still another problem with the conventional short circuit protection design is that once the fuse is blown, the circuit is permanently disabled.

BRIEF SUMMARY OF THE INVENTION

The present invention is directed to a short circuit protection system that includes an inductor having a first terminal and a second terminal. A switch having a first side and a second side has its second side coupled to the first terminal of the inductor. When the first and second sides of the switch are electrically coupled, an electric current can flow through the switch and inductor. A voltage sensing circuit is coupled to the first side of the switch and the second terminal of the inductor. A controller is coupled to the voltage sensing circuit and switch. The controller opens the switch when a voltage at the second terminal of the inductor transitions from above a threshold voltage to below the threshold voltage. The controller also closes the switch when the voltage at the second terminal of the inductor transitions from below the threshold voltage to above the threshold voltage.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

Figure 1:
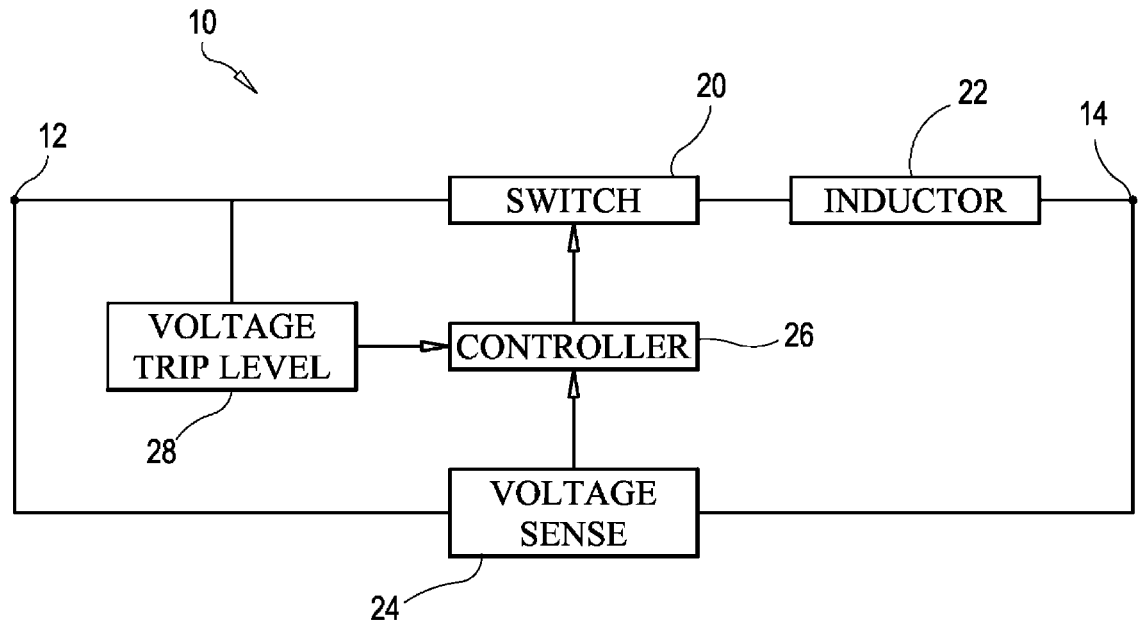
FIG. 1 is a block diagram of a short circuit protection system in accordance with an embodiment of the present invention.

Referring now to the drawings and more particularly to FIG. 1, a "short circuit protection" (SCP) system in accordance with an embodiment of the present invention is shown and is referenced generally by numeral 10. In general, SCP system 10 can be incorporated into a variety of electrical circuits between a DC power source (not shown) and an electrical load (not shown). More specifically, SCP system 10 has an input node 12 that will typically be coupled to the positive polarity output of a DC power source, and an output node 14 that will typically be coupled to the positive polarity input of an electrical load.

SCP system 10 includes the following functional blocks that could be implemented in a variety of ways without departing from the scope of the present invention. Coupled in series between nodes 12 and 14 are a switch 20 and an inductor 22 with one side of switch 20 coupled to input node 12 and one side of inductor 22 coupled to output node 14. Switch 20 can be implemented with devices such as a relay, a transistor, a "field effect transistor" (FET) such as a "metal oxide semi conductor" FET (MOSFET), etc. Generally, and as will be explained further below, switch 20 is an electronic two-position switch (i.e., open or closed) where switch 20 is opened when a short circuit is detected and closed when there is no short circuit to include the condition of no short circuit after a short circuit condition has been removed or eliminated. When switch 20 is closed, switch 20 and inductor 22 define a path for electric current. Inductor 22 is any conventional inductor sized/rated for a particular application. As will be explained further below, the present invention takes advantage of the following two properties of inductors to provide a fast-responding SCP system. The first property is that current through an inductor does not change instantaneously. The second property is that voltage across an inductor can change instantaneously.

Figure 2:
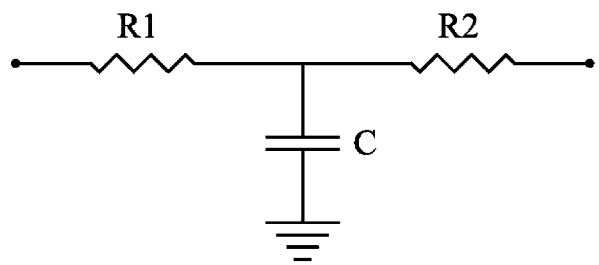
FIG. 2 is a schematic view of a voltage divider circuit used as the voltage sense in an embodiment of the present invention.

SCP system 10 further includes a voltage sense 24 coupled between nodes 12 and 14 for sensing the voltage at node 14 with respect to node 12. As will be explained further below, the coupling of voltage sense 24 in this fashion allows SCP system 10 to be reset after a short circuit condition no longer exists. Voltage sense 24 can be implemented by a voltage divider circuit such as the one illustrated in FIG. 2 where $R_1$ and $R_2$ can be set equal to one another for simplicity, and a capacitor C is coupled between $R_1$ and $R_2$ and ground potential. As will be explained further below, using a voltage divider circuit for voltage sense 24 allows SCP system 10 to detect a zero (or near zero) voltage condition at node 14 to open switch 20, and then detect when it is again safe to reset or close switch 20.

The opening/closing of switch 20 is governed by a controller 26 that essentially compares the voltage at node 14 (as sensed by voltage sense 24) with a reference or threshold voltage provided to controller 26 by a voltage trip level 28. Controller 26 can be implemented by a comparator that can generate a control signal to open/close switch 20. Such comparators are well known in the art and can be an open collector type, an open drain type, a rail-to-rail push-pull output type, etc., without departing from the scope of the present invention. Voltage trip level 28 is typically accomplished using a voltage reference element, diodes, resistors, and/or capacitors as would be well understood in the art.

In the general case, SCP system 10 is designed to (i) allow current flow from node 12 to node 14 (through switch 20 and inductor 22) provided the voltage sensed by voltage sense 24 is at or above a threshold voltage provided to controller 26 by voltage trip level 28, (ii) open switch 20 to interrupt the current flow from node 12 to node 14 when the voltage sensed by voltage sense 24 falls below the prescribed threshold voltage, and (iii) close or reset switch 20 to restore current flow from node 12 to node 14 when the voltage sensed by voltage sense 24 is once again at or above the threshold voltage. As used herein, the term "reset" refers to the re-closing of switch 20 once a short circuit condition has been removed/eliminated. Note that for many electric load designs, once a short circuit is removed, the voltage at node 14 may not attain or go above the prescribed threshold voltage unless the load is disconnected from the circuit and then reconnected. That is, once switch 20 has been opened, a load placed at node 14 may draw sufficient current through voltage sense 24 to prevent the resetting of switch 20. Accordingly, the load (and potentially battery 100) may need to be disconnected and then reconnected in order to allow switch 20 to reset.

For SCP 10 operating in terms of short circuit protection, the threshold voltage used to control the opening of switch 20 should be indicative of a zero or approximately zero voltage condition at node 14. That is, when the electrical circuit (not shown) incorporating SCP system 10 is operating normally, the voltage at output node 14 will be very close to that at input node 12. If there is a short in the electrical circuit incorporating SCP system 10, the current through inductor 22 does not change in the short term; however, the voltage at the output of inductor 22 (i.e., the voltage at output node 14) immediately drops to zero or approximately zero. This voltage drop is immediately sensed by voltage sense 24 such that controller 26 opens switch 20. Thus, the present invention prevents the current spike that traditional resistor-based short circuit protection systems rely upon.

Generally speaking, voltage sense 24 will detect a short circuit when the voltage at node 14 drops to zero (or approximately zero since there typically will be some small resistance in most short circuits). Controller 26 uses the output of voltage sense 24 to open switch 20 when this zero/low voltage condition occurs. When the voltage at node 14 is once again a positive voltage (indicating that the short circuit has been removed), controller 26 uses the output of voltage sense 24 to reset/close switch 20. Use of a voltage divider for voltage sense 24 allows the present invention to readily achieve the zero (or near zero) voltage detection at node 14 (that brings about the opening of switch 20) and provide for the resetting (closing) of switch 20 when a positive voltage is detected at node 14. More specifically, the use of a voltage divider allows a zero voltage condition at node 14 to be referenced to a positive voltage level (e.g., one-half the voltage of battery 100 when $R_1=R_2$ for the voltage divider circuit illustrated in FIG. 2) that is used to specify the threshold voltage provided to controller 26 by voltage trip level 28. In this way, controller 26 detects (i) when the voltage sensed by voltage sense 24 transitions from above the threshold voltage to a voltage below the threshold voltage thereby causing switch 20 to be opened, and (ii) when the voltage sensed by voltage sense 24 transitions from below the threshold voltage to a voltage above the threshold voltage thereby causing switch 20 to be reset or closed.

Figure 3:
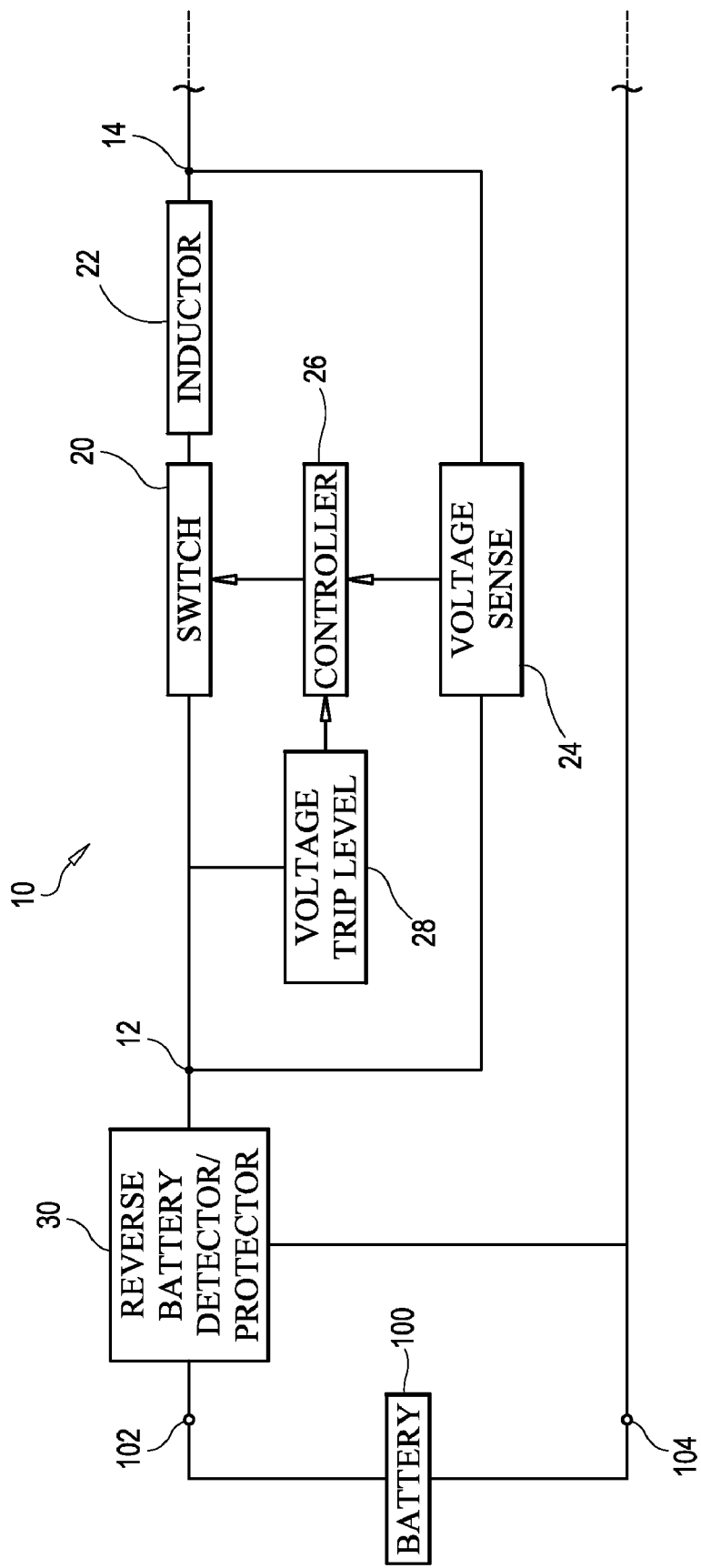
FIG. 3 is a block diagram of a short circuit protection system that further includes reverse battery protection in accordance with another embodiment of the present invention.

The present invention will work with any DC powered electrical circuit. In many instances, the DC power is supplied by a battery having positive and negative polarity terminals. When such a battery is replaced, there is always a chance that a user/technician installs the battery with the terminals reversed in an electrical circuit. Such a connection can damage the electrical circuit or load thereby necessitating a repair or replacement. Accordingly, SCP system 10 can be paired with a reverse battery detector/protector 30 as illustrated in FIG. 3. In general, reverse battery detector/protector 30 is coupled between a circuit's positive polarity terminal 102 and node 12, and coupled to negative polarity terminal 104. When properly installed, a battery 100 has its positive and negative outputs respectively coupled to terminals 102 and 104. (Conventional reverse battery protection involves the use of a diode in series with the positive polarity terminal of a battery where the diode has a relatively large voltage drop that is typically in the range of 0.3 to 1.0 volts.) In order to minimize the voltage drop across detector/protector 30, the present invention implements a reverse battery detector/protector circuit that will be described with reference to FIG. 4.

Figure 4:
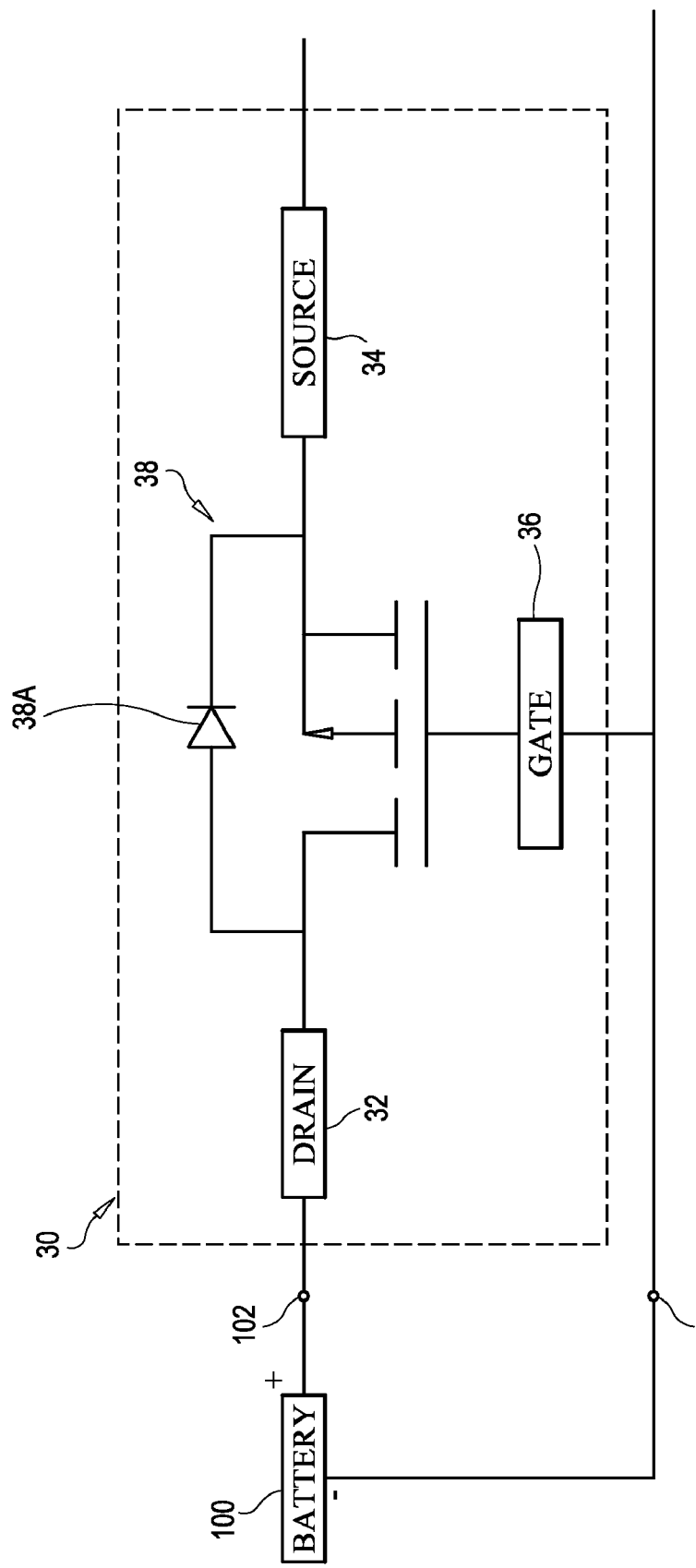
FIG. 4 is an isolated schematic view of the reverse battery protection implemented with a MOSFET in accordance with an embodiment of the present invention.

In FIG. 4, reverse battery detector/protector 30 is realized by a MOSFET having a drain 32, a source 34, and a gate 36. For purpose of illustration, the equivalent circuit defined by drain 32, source 34 and gate 36 is referenced generally by numeral 38. The present invention orients the MOSFET backward (relative to its conventional circuit installation) for reverse battery protection and relies on the parasitic (but real) diode 38A inside the MOSFET to make it work properly. When battery 100 is connected correctly in terms of its output polarities, the current will initially flow through diode 38A in the MOSFET and raise the source voltage above the gate voltage. This will turn the MOSFET on and allow current to flow through the MOSFET to the output. Since the "on" resistance of a MOSFET is very low (i.e., on the order of 0.02 ohms), the voltage drop across the MOSFET will be very low (i.e., at 1 amp, the drop will be 0.02 volts compared to up to 1.0 volts for a standard diode). If battery 100 is connected in the reverse polarity, then the voltage at the gate will be the same or higher than the voltage at the source. This will cause the MOSFET to remain off and no current can flow. Note also that a regular diode will block a charging current applied at the output of source 34 and prevent battery 100 from being charged. In contrast, the present invention's use of the MOSFET as described allows battery 100 to be charged by applying a charging current at the output of source 34.

Figure 5:
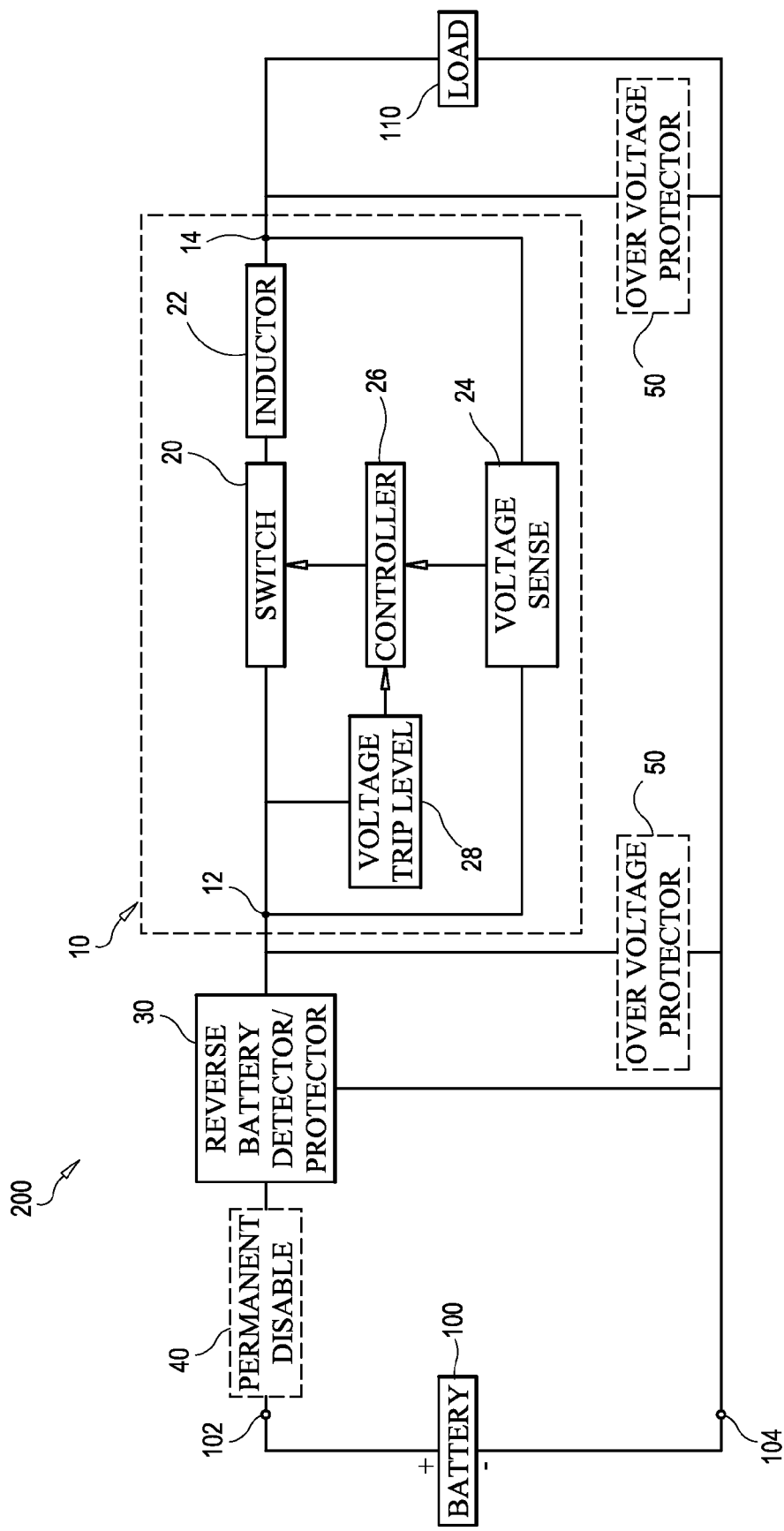
FIG. 5 is a block diagram of an electrical circuit incorporating short circuit protection and reverse battery protection in accordance with an embodiment of the present invention.

As mentioned above, SCP system 10 and (if needed) reverse battery detector/protector 30 can be included in a variety of electrical circuits. For example, FIG. 5 illustrates one such electrical circuit 200 that includes a battery 100, an electrical load 110, SCP system 10, and reverse battery detector/protector 30 as described herein. Circuit 200 could also include a permanent disable 40 (e.g., a fuse) coupled between positive polarity terminal 102 and detector/protector 30, and one or more over voltage protectors 50 (e.g., two are shown), each of which can be realized by a transient voltage suppression diode (e.g., a Zener diode, a Trasorb, etc.) as would be understood in the art. The optional nature of these elements/blocks is indicated by the dashed-line box representation thereof.

The advantages of the present invention are numerous. Short circuits are detected and responded to without allowing the conventional current spike associated with a short circuit. The present invention will also automatically reset its internal switch once the short circuit condition is no longer detected. For battery powered circuits, the present invention can be paired with a reverse battery protection system that minimizes voltage drop and allows the battery to be recharged while installed in its electrical circuit.

Although the present invention has been disclosed in terms of a number of preferred embodiments, it will be understood that numerous modifications and variations could be made thereto without departing from the scope of the invention as defined by the following claims:

We claim:

1. A short circuit protection system comprising:
an inductor having a first terminal and a second terminal;
a switch having a first side and a second side with said second side being coupled to said first terminal of said inductor wherein, when said first side is electrically coupled to said second side, an electric current is adapted to flow through said switch and said inductor;
a voltage sensing circuit coupled to said first side of said switch and said second terminal of said inductor; and
a controller coupled to said voltage sensing circuit and said switch, said controller opening said switch only when a voltage at said second terminal of said inductor transitions from above a threshold voltage of approximately zero volts to below said threshold voltage, and said controller closing said switch when said voltage at said second terminal of said inductor transitions from below said threshold voltage to above said threshold voltage.

2. A system as in claim 1 wherein said threshold voltage is greater than zero volts.

3. A system as in claim 1 wherein said switch comprises a two-position switch.

4. A system as in claim 1 wherein said voltage sensing circuit comprises a voltage divider.

5. A system as in claim 1 wherein said controller includes a comparator for comparing said voltage at said second terminal of said inductor with said threshold voltage.

6. A short circuit protection system comprising:
an inductor having a first terminal and a second terminal with said second terminal of said inductor adapted to be coupled to one electrical side of a load;
a switch having a first side and a second side with said first side of said switch adapted to be coupled to a positive polarity of a DC power source wherein a negative polarity of the DC power source is adapted to be coupled to another electrical side of the load, said second side of said switch coupled to said first terminal of said inductor wherein said switch and said inductor are electrically in series;
a voltage sensing circuit coupled to said first terminal of said switch and said second terminal of said inductor; and
a controller coupled to said voltage sensing circuit and said switch, said controller opening said switch only when a voltage at said second terminal of said inductor transitions from above a threshold voltage of approximately zero volts to below said threshold voltage, and said controller closing said switch when said voltage at said second terminal of said inductor transitions from below said threshold voltage to above said threshold voltage.

7. A short circuit protection system comprising:
an inductor having a first terminal and a second terminal with said second terminal of said inductor adapted to be coupled to one electrical side of a load;
a switch having a first side and a second side with said first side of said switch adapted to be coupled to a positive polarity of a DC power source wherein a negative polarity of the DC power source is adapted to be coupled to another electrical side of the load, said second side of said switch coupled to said first terminal of said inductor wherein said switch and said inductor are electrically in series;
a voltage sensing circuit coupled to said first terminal of said switch and said second terminal of said inductor;
a controller coupled to said voltage sensing circuit and said switch, said controller opening said switch when a voltage at said second terminal of said inductor transitions from above a threshold voltage to below said threshold voltage, and said controller closing said switch when said voltage at said second terminal of said inductor transitions from below said threshold voltage to above said threshold voltage; and
a MOSFET adapted to be interposed between the DC power source and said switch, said MOSFET having a source terminal, a drain terminal, and a gate terminal, said drain terminal adapted to be coupled to the positive polarity of the DC power source, said source terminal coupled to said first terminal of said switch, and said gate terminal adapted to be coupled to a potential that is common to the negative polarity of the DC power source.

8. A system as in claim 7 wherein said threshold voltage is greater than zero volts.

9. A system as in claim 7 wherein said switch comprises a two-position switch.

10. A system as in claim 7 wherein said voltage sensing circuit comprises a voltage divider.

11. A system as in claim 7 wherein said controller includes a comparator for comparing said voltage at said second terminal of said inductor with said threshold voltage.

12. An electrical circuit incorporating short circuit protection, comprising:
a DC power source having a positive polarity output and a negative polarity output;
an electrical load having a positive polarity input and a negative polarity input with said negative polarity input coupled to said negative polarity output of said DC power source;
an inductor having a first terminal and a second terminal with said second terminal of said inductor coupled to said positive polarity input of said load;
a switch having a first side and a second side with said first side of said switch coupled to said positive polarity output of said DC power source, said second side of said switch coupled to said first terminal of said inductor wherein said switch and said inductor are electrically in series;
a voltage sensing circuit coupled to said first terminal of said switch and said second terminal of said inductor; and
a controller coupled to said voltage sensing circuit and said switch, said controller opening said switch only when a voltage at said second terminal of said inductor transitions from above a threshold voltage to below said threshold voltage, and said controller closing said switch when said voltage at said second terminal of said inductor transitions from below said threshold voltage to above said threshold voltage, wherein said threshold voltage is indicative of an approximately zero voltage condition at said second terminal of said inductor.

13. An electrical circuit incorporating short circuit protection, comprising:
- a DC power source having a positive polarity output and a negative polarity output
- an electrical load having a positive polarity input and a negative polarity input with said negative polarity input coupled to said negative polarity output of said DC power source;
- an inductor having a first terminal and a second terminal with said second terminal of said inductor coupled to said positive polarity input of said load;
- a switch having a first side and a second side with said first side of said switch coupled to said positive polarity output of said DC power source, said second side of said switch coupled to said first terminal of said inductor wherein said switch and said inductor are electrically in series;
- a voltage sensing circuit coupled to said first terminal of said switch and said second terminal of said inductor; and
- a controller coupled to said voltage sensing circuit and said switch, said controller opening said switch when a voltage at said second terminal of said inductor transitions from above a threshold voltage to below said threshold voltage, and said controller closing said switch when said voltage at said second terminal of said inductor transitions from below said threshold voltage to above said threshold voltage, wherein said threshold voltage is indicative of an approximately zero voltage condition at said second terminal of said inductor; and
- a MOSFET interposed between said DC power source and said switch, said MOSFET having a source terminal, a drain terminal, and a gate terminal, said drain terminal coupled to said positive polarity output of said DC power source, said source terminal coupled to said first terminal of said switch, and said gate terminal coupled to said negative polarity output of said DC power source.

14. A system as in claim 13 wherein said threshold voltage is greater than zero volts.

15. An electrical circuit as in claim 13 wherein said DC power source comprises a battery.

16. An electrical circuit as in claim 13 wherein said switch comprises a two-position switch.

17. An electrical circuit as in claim 13 wherein said voltage sensing circuit comprises a voltage divider.

18. An electrical circuit as in claim 13 wherein said controller includes a comparator for comparing said voltage at said second terminal of said inductor with said threshold voltage.

19. An electrical circuit as in claim 13 further comprising at least one transient voltage suppression diode electrically disposed between said DC power source and said load.

\* \* \* \* \*